UNITED STATES PATENT OFFICE

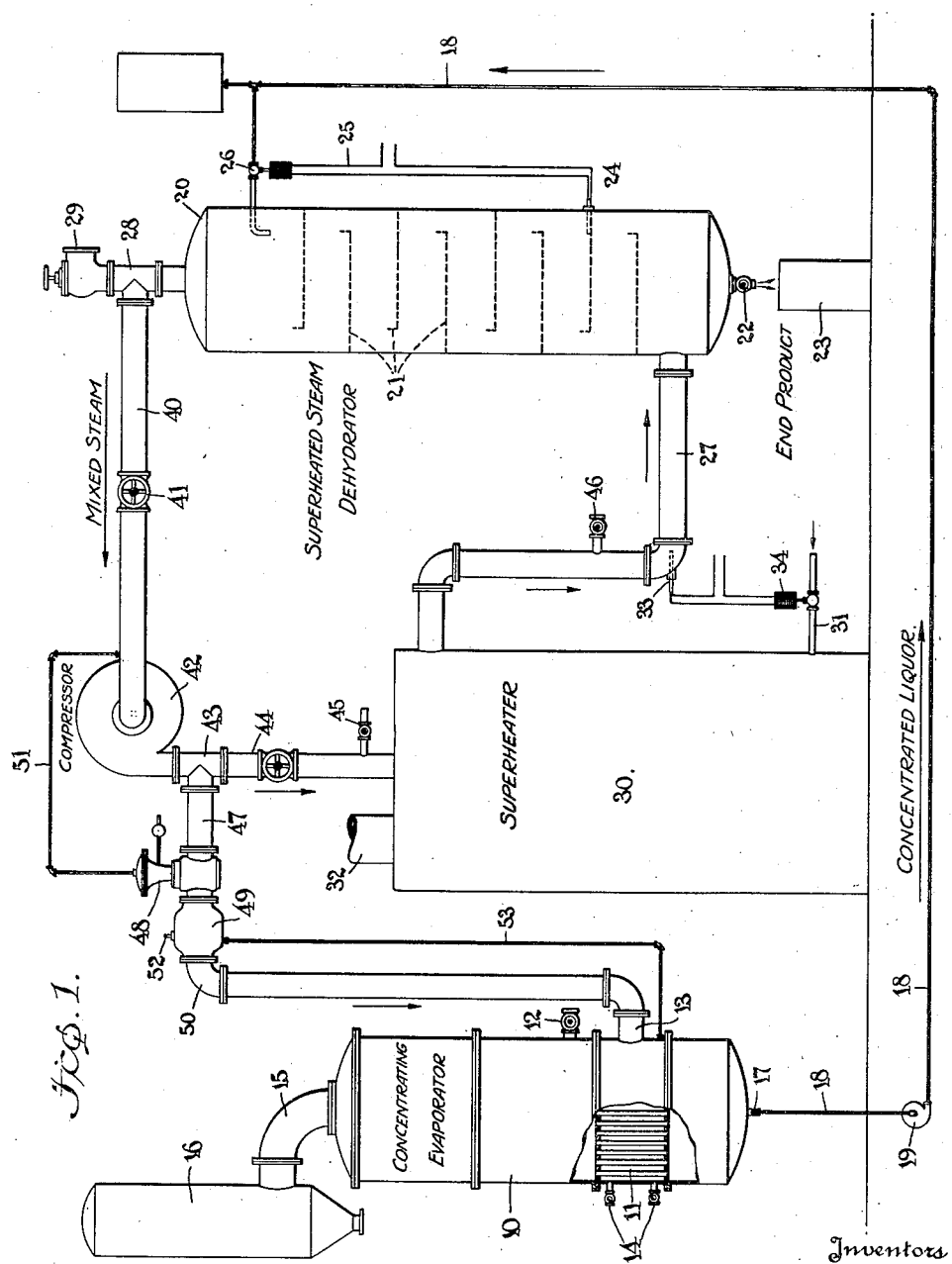

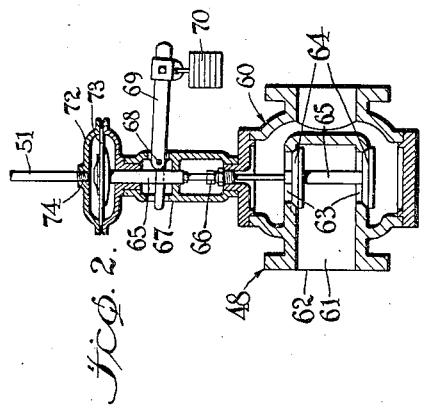
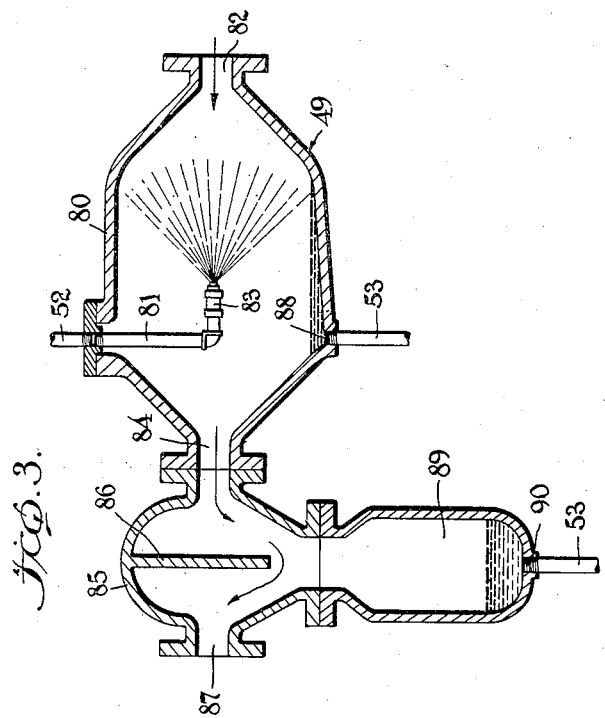

BURTON S. HUGHES, WILLIAM H. EGGERT, AND STANLEY HUGHES, OF BUFFALO, NEW YORK, ASSIGNORS TO ZAREMBA COMPANY, OF BUFFALO, NEW YORK

METHOD OF AND APPARATUS FOR EVAPORATING SOLUTIONS

Application filed June 26, 1930. Serial No. 464,040.

This invention relates to the evaporation, concentration, and dehydration of industrial solutions, and it has particular reference to a method of and to apparatus for effecting the extraction of water from such solutions, to any extent desired, by the controlled employment of hot gaseous medium such as superheated steam.

It is frequently desirable in the technical arts to evaporate solutions to obtain in marketable form the solids contained therein. Such evaporation presents a number of technical problems originating in the character of the liquor undergoing treatment, or the cost of the operations. It has heretofore been variously proposed to heat the solution by flame or products of combustion, but such application involves considerable heat loss, and is not adapted for the treatment of many liquors wherein an excessive temperature rise will cause a deterioration in the final product. Economies of operation and more satisfactory results have been obtained by heating the liquid with live steam passing through a coil inserted in or contacting with the solution. Other proposals have been made to contact the solution directly with hot gases, which is open to the objection that the gases are apt to impair the product, and it has also been suggested in the literature that the evaporation of certain liquids might be effected by contacting them with superheated steam. So far as we are aware or have been advised, however, these suggestions have not met with any extended commercial application, and the usual industrial practice at the present time is to concentrate the liquors by indirect steam heat applied in conjunction with reduced pressure on the liquor body.

In the stated method of the usual evaporating procedure, that is, vacuum pan or multiple effect evaporation, conditions may be obtained and apparatus designed to effect the removal of a major portion of the water, without marked deterioration of the product and with good economy of applied heat. This method of operation is often limited, however, with respect to the degree of concentration, by the characteristics of the solution undergoing treatment, which change as evaporation progresses. It is therefore often necessary to remove a concentrated liquor from the steam evaporating apparatus or system, and to finish the evaporation by other means. This condition, which arises from the fact that the apparatus is not suitable for the treatment of both dilute and highly concentrated liquids, necessitates the use of additional and often expensive apparatus, and also interferes with the continued economy of heat transfer and the preservation of the desired product.

In the present invention, we provide means for effecting the evaporation of technical or industrial solutions, to any point desired, by using superheated steam as the source of the heat energy necessary to the evaporation, wherein the objections to the steam evaporating systems are obviated. The term "superheated steam", as we understand it and employ it herein, refers to steam which is at a temperature higher than that required to maintain the steam in the gaseous or vapor phase, under the existing pressure. This condition is obtained in practice by separating saturated steam from the body of water from which it is formed, and heating the steam still further, which causes an increase in temperature. This medium, which consists of water in gaseous form, may be used for evaporating purposes, as the excess temperature of the steam (degrees of superheat) may be extracted therefrom and transferred to the solution undergoing evaporation.

It is to be observed, however, that when superheated steam has parted with its excess heat, and so becomes simply saturated steam, it can not be readily used as a dehydrating medium in direct contact methods of evaporation, as further removal of heat causes the steam to condense, and so produce water. The use of superheated steam in an evaporation method wherein a body of water is brought into direct contact with the steam appears, therefore, to be both anomalous and inefficient, and we have found it to be so, unless proper care and control is exercised over the heat transfer. Thus, in a method in which saturated steam coming from the liquid body, consisting of the former body of superheated steam and the water taken up thereby, is again superheated for use anew; it is apparent that the mass of steam increases as evaporation proceeds, and that; for a given pressure the volume will also increase. In such cyclic system of operation, it has heretofore been proposed to vent a portion of the steam to waste, in order to keep the volume thereof within proper limits, but such proposal, as stated, does not take into consideration other important factors relating to the efficient maintenance of the circuit. We further observe that the amount of heat energy required in the evaporating action will vary with the changes in concentration, volume, or temperature of the solution being treated; or, if the degree of superheat be changed, this alteration will affect the rate of evaporation.

For the proper operation of a process employing superheated steam as a direct evaporating medium, therefore, due consideration should be given to a correlation of the numerous factors of volume of steam, degree of superheat, character and condition of liquid, etc., and in our present invention we provide suitable controls, advantageously in an automatic manner.

From what has been said above with regard to the behavior of solutions undergoing evaporation, it may be appreciated that the use of superheated steam may be made independently upon an original body of liquid, or it may be associated with a preliminary treatment of the liquid in apparatus such as is now extensively employed. We, therefore, contemplate the evaporation or dehydration of solutions which have previously been partially concentrated and are thus deprived of a portion of their water content, and have been brought to a temperature best suited for treatment. In the present invention, we provide for the preconcentration of solutions prior to the treatment thereof with superheated steam, in a general way by utilizing the vapors evolved from the liquid (or the heat content thereof) as a medium for effecting the pre-concentration of the solution by indirect heating.

Generally viewed, therefore, it may be stated that our invention comprehends the evaporation, to any extent desired, of industrial solutions by the conjoint use of direct and indirect steam heating in a cyclic system, wherein proper regard is given at all times to the control of the rate of evaporation and the flow of the solution. The principles of the invention may be further understood by the following description of a typical system, illustrated in the accompanying drawings, wherein:

Fig. 1 is a diagrammatic view, partially in elevation and partially in cross-section, of an apparatus assembly;

Fig. 2 is a cross-sectional view of a pressure regulating valve, and

Fig. 3 is a cross-sectional view of a steam desuperheater.

Referring first to Fig. 1, the apparatus herein illustrated comprises a preliminary evaporator 10, in which the solution to be treated may be partially evaporated, and a second evaporator 20, in which either the original dilute or the partially concentrated solution is evaporated or dehydrated by means of superheated steam. A superheater 30 is also illustrated, and this unit serves the purpose of providing a source of superheated steam for delivery to the dehydrator 20. Associated with and interconnecting these units are various steam and liquid pipes provided with valves and control devices, to which specific reference will hereinafter be made. With the apparatus as shown, the method of evaporating may be employed which consists in admitting the solution to be treated into the preliminary evaporator 10, wherein it is partially concentrated, and from which it is delivered to the dehydrator 20. Herein the solution flows into direct contact with a current of superheated steam, which causes the evaporation of the solution to the point desired, and creates a body of steam or vapors flowing out of the dehydrator. The steam is then divided into two portions, one of which is sent to the preliminary evaporator 10, to effect the pre-concentration of fresh quantities of solution, while the other portion is sent through the superheater for reconditioning and recirculation to the dehydrator. These various flows are all properly controlled, and the several controls may be correlated with each other, in order to permit of the uniform or even rate of evaporation. It will also appear that, by virtue of the various valves, etc., in the connections, several cycles of operation, or paths of flow, may be adopted, the desirability of any of which can be determined from a consideration of the specific operating problem.

The preliminary evaporator 10 is shown as being of the customary single effect evaporator type, and it includes a shell or casing in which is disposed a steam jacket or tube bundle 11. Liquid to be concentrated is admitted to the casing and in and through the tubes through a valved pipe 12, while steam is admitted to flow around the tubes through a steam pipe 13. Valved pipes 14 provide for the escape of non-condensible gases and water condensed from the steam, while vapors arising from the liquid undergoing evaporation are removed from the casing through a port 15 in the top thereof, being delivered, advantageously, to a condenser 16, which serves to reduce the pressure in the casing, and so permits of evaporation at a lowered temperature. The heat in the steam is transmitted through the walls of the tubes in the tube bundle 11, to cause the evaporation, and the partially evaporated liquid is withdrawn, as desired, from the bottom of the casing, through the valved connection 17, into the pipe 18, and is transmitted to the dehydrator 20 by means of the force pump 19 interposed in the pipe line.

The evaporator 20, (which we herein call the dehydrator because the solution may be completely desiccated therein), consists of a shell or casing within which are positioned a number of shelves or trays 21, secured along one marginal portion to the shell wall, and extending outwardly therefrom to a region adjacent the opposite wall of the shell. The arrangement of trays is such that they project outwardly, one above the other, from opposite walls of the shell in alternate order, so that liquid spilling over the lip of the top tray will be caught by the next lower, and must flow along it before spilling over into the third tray. The operating conditions within the shell are such that, at or about the time the entering solution reaches the lowermost tray, evaporation has proceeded to the point desired. This, in the present invention, may be complete dehydration, and it is then often advantageous to deliver the desiccated material in a molten or fused or like liquid state, withdrawal from the apparatus being effected through a valved pipe 22 either continuously or intermittently, into a receptacle 23, which may be a shipping container.

The progress of evaporation in the dehydrator 20 is controlled in order to deliver the desired end product and to utilize to best advantage the heat input thereto. This may be accomplished by controlling the rate of flow of the entering solution, and we have found that temperature control is most advantageous for the usual operating conditions. In one way of working, a thermocouple or like temperature responsive device 24 is positioned on one of the lower trays 21, and governs, through the connection 25, the opening or closing of a valve 26 interposed in the pipe line 18 at a point adjacent its connection to the liquid inlet for the shell, which is preferably above the upper tray. The arrangement is such that, if the temperature of the liquid flowing past the thermocouple 24 is below a predetermined point, the valve 26 is closed, and if the temperature at the predetermined point rises above the prescribed limit, the valve 26 is opened. Under these conditions, the temperature of the liquid at the thermocouple is maintained within limits best suited for practical operation, and it follows that since the temperature of the material is an index to its entire energy condition, such regulation is effective to maintain uniformity of operation.

Superheated steam for evaporating the solution is admitted into the shell 20 through a pipe line 27, flowing upwardly around the trays 21, in a direction counter to the flow of liquid, so that the steam of highest energy content contacts directly with the concentrated material. The heat exchange between superheated steam and liquid causes the water of the solution to evaporate, thereby generating additional quantities of steam, and the entire body of exhaust steam, consisting of the spent superheated steam and the generated steam, flows out of the shell through a pipe 28, and may be vented to the atmosphere by manually or automatically opening a valve 29, if desired.

The superheated steam is made in the superheater 30, conventionally illustrated, and flows therefrom through the pipe 27 into the dehydrator 20. Preferably, the superheater is of the gas or oil fired type, fuel in fluid condition being supplied through a valved pipe 31 to a suitable burner within the furnace for heating the coils of the superheater, and products of combustion being removed through the flue 32. Extending into the pipe 27 is a thermocouple 33 for measuring the temperature of the superheated steam, and controlling, by virtue of the temperature condition therein, the operation of a valve 34 in the fuel intake line 31. The actuation of the valve 31 is similar to the operation of the valve 26 in the solution intake line 18,—that is, if the temperature of the superheated steam exceeds a predetermined limit, the fuel supply is reduced automatically, and if the superheated steam temperature falls too much, the amount of fuel or rate of combustion is increased, so that the steam passing through the superheater may be brought to the proper temperature.

It will be observed, therefore, that, presupposing a regular flow of steam from the superheater 30, the amount of available energy in the superheated steam supplied to the dehydrator 20 is held at or within fixed limits. It may be said that the available energy supplied to the dehydrator for evaporating purposes is maintained at a constant value. The amount of solution flowing to the dehydrator is likewise regulated, so that, with a constant supply of available heat, and the injection of solution in amounts calculated to properly utilize such heat, the evaporating action in the dehydrator is maintained regular or uniform at all times. The correlation of heat input and work to be done is desirable, since the evaporating action is essentially one of energy exchange. By fixing, within fairly close limits, the energy flow of the superheated steam, and varying the flow of the liquid in response to departures from a normal value, the evaporating operation may be made substantially uniform or constant without variations in pressure or volume of evolved vapors. It will be understood, of course, that either flow may be so predetermined, or that a purely nominal control may be exercised over one of them, but the conjoint control of both is recommended for most efficient operation in practice.

Having thus shown a manner in which the solution and superheated steam may be brought into mutual contact within the dehydrator 20, we shall now discuss the flow of exhaust steam from the zone of evaporation. As the superheated steam passes upwardly between the plates 21, its excess heat is transferred to the solution flowing downwardly over the plates, creating or generating a body of steam coming from the solution. The superheated steam is, at the same time, cooled or expended and approaches the condition of ordinary steam, or a condition wherein, if further heat were extracted, condensation and formation of water would occur. To guard against this latter possibility, we preferentially so adjust the operating conditions that the mixed body of expended steam generated steam passes upwardly, into the exhaust port 28, with a slight residual amount of superheat, and at about atmospheric pressure. These values are not regarded as necessarily critical, as the system may be operated with a positive or negative pressure in the steam withdrawn, and all of the superheat may be removed. The stated conditions are, however, as we have found, advantageous for good operation, and since we contemplate, in the most comprehensive form of our invention, the recirculation of the exhaust steam, no loss of energy is entailed by retaining a limited degree of superheat in the vapors withdrawn. On the contrary, the tendency toward condensation within the dehydrator is minimized, and the apparatus may be simplified.

When desired, the entire body of exhaust steam may be vented to the atmosphere through the valve 29, or may be led away to a heat economizer or condenser. Such operation presupposes a non-cyclic system of operation, or operation under conditions to which the full cyclic system is deemed unadapted.

Assuming the re-circulation of the exhaust steam, the valve 29 is normally closed, and the entire body of exhaust steam is thereby caused to flow through the conduit 40, provided with a valve 41 that may be closed when the valve 29 is opened. The pipe 40 leads to the intake side of a turbo-compressor 42 serving the function of positively withdrawing the steam entering the pipe 40, and at a substantially constant rate. The delivery side of the pump 42 is connected to a T 43, one branch of which is in communication with a valved pipe 44 leading to the superheater 30. The pipe 44 may also be connected to a steam pipe 45 through which steam may be supplied to the superheater when re-circulation is not employed. In conjunction with the supply pipe 45, reference may here be made to the supply pipe 46, located on the outlet side of the superheat 30 and in the feed pipe 27. With these connections, steam may be fed to the dehydrator 20 from an original source, with or without heating in the superheater 30, and these connections are advantageously used in starting the operation and for clearing the apparatus of air.

Under the usual conditions of operation, however, a portion of the steam withdrawn from the dehydrator 20 will be forced by the compressor 42 into the superheater 30, via the pipe line 44. Upon return to the superheater, the steam is reconditioned to substantially the same degree of superheat as it originally had, and is then transmitted to the dehydrator for use anew, in the manner previously outlined. The pump 42 should be operated at a constant speed, to insure uniformity of operation, and the pressure developed thereby should be sufficient to overcome the resistance to flow in the circuit. Excessive pressures are not wanted, however, as they lower the available superheat in the steam for any given temperature.

The balance of the steam coming from the compressor 42 flows through the other branch of the T 43 into a pipe 47, through a pressure actuated valve 48, desuperheater 49, and steam pipe 50, which is connected to the pipe 13 leading to the steam chest of the tube bundle 11 in the preliminary evaporator 10. Generally considered, the division of steam between the branches 44 and 47 is in proportion to the relative amounts of expended superheated steam and generated steam in the exhaust steam, so that a substantially constant mass of steam is maintained in the superheater circuit, while the steam delivered to the evaporator 10 corresponds to the generated steam coming from the solution in the dehydrator 20. In this connection, however, it should be borne in mind that the division or proportioning of the steam is not based on volumes alone, as what is more useful is a division into proportions corresponding to energy values. Thus, if the pressure or temperature in the exhaust steam be subjected to some sudden change, the proportions should be changed, in order to maintain uniformity of operation and economic conservation of heat. It is also apparent that, if the valve in the pipe 44 be closed, all of the exhaust steam may be sent to the preliminary evaporator, or, if the solution in the evaporator 10 has been brought to the desired density, none of the steam need be so delivered.

The pressure regulating valve 48 provides a means for effecting the proportioning of exhaust steam between the two branches or circuits in accordance with the pressure existing in the pipe line 40, and hence in the body of steam coming from the dehydrator 20. As more fully shown in Fig. 2, the valve 48 is provided with a weighted lever controlling an internal diaphragm, so that the valve opening may be made responsive to a predetermined pressure. The pressure of the steam in the pipe line 40 is imparted to the diaphragm by means of a pipe line 51 which serves as a by-pass around the compressor 42, thereby making the setting of the valve 48 dependent upon the pressure of the exhaust steam prior to delivery from the pump 42. With this arrangement, as long as the steam pressure in line 40 remains constant, the exhaust steam will be divided proportionately to volumes between the preliminary evaporator and the superheater, so that the generated steam alone will be sent to the preliminary evaporator. If the pressure should suddenly change, however, the same volumetric ratio would not serve to ensure the same energy division;—it would indicate that more vapors had been generated, for example, and hence the valve is made to open automatically a greater amount, so that the excess steam is also delivered to the preliminary evaporator 10. Or, if the pressure should drop, the valve 48 automatically closes, thereby preventing some of the steam which should go to the superheater from entering the pipe 50.

As previously stated, the exhaust steam is maintained at a limited degree of superheat, and hence superheated steam is or may be delivered through the branch 47. As this steam is intended for the indirect heating of the solution, it is desirable to remove the superheated condition, for superheated steam is not as efficient for indirect heating methods as saturated steam. Of course, a certain amount of pre-concentration could be attained by bubbling the steam coming through the pipe 50 directly into the body of liquid in the preliminary evaporator, relying upon the vacuum created in the condenser 16 for causing a reduction in boiling point making ebullition possible at the existing temperatures. The indirect method is, however, the better.

The desuperheater 49 is so constructed as to permit of the mixing therein of the steam passing therethrough with hot water entering through the pipe 52. So much of the water as is required to saturate the steam is vaporized, thus providing a flow of completely saturated steam to the preliminary evaporator where it may expend its energy to best advantage in evaporating the solution. Excess water is also delivered to the steam chest of the tube bundle 11 by means of the drain pipe 53.

As previously noted, the energy of the steam entering the evaporator 10 is expended in concentrating the solution, which is then conveyed to the dehydrator 20. As the energy input into the evaporator 10 depends upon the work done in the dehydrator, which in turn depends upon the characteristics of the solution flowing from the evaporator, it will be seen that the system not only provides for an efficient utilization of heat, but that the effects are interrelated to further provide for uniform operation.

A more detailed explanation may now be made of the various devices incorporated in the system to provide the indicated controls.

With reference to the control of superheated steam temperature and flow of solution into the dehydrator 20, we have found that good practical results are attainable by using the known types of electrical thermometers whose thermal or electrical condition affects the operation of a solenoid valve. As the details of such devices are well known, and form no part of our invention, it is deemed sufficient for the present purposes to indicate the method of application or use in our invention. In general, the thermocouple is composed of a pair of connected wires formed of dissimilar metals, which are exposed at their junction to the temperature which is to be measured. If a circuit be created by connecting the opposite ends of the wires at a point removed from the hot junction, an electric current will flow, and the absolute value of this current will vary with changes in the temperature. The current value may be opposed, through a suitable resistance or potentiometer, by a current from another source, so that, for any predetermined temperature at the hot junction, no electricity will flow through the circuit. If, however, the temperature changes, current will flow in one or the other direction, depending upon an increase or decrease in the temperature. These changes may be magnified, and caused to operate a solenoid, which in turn is connected mechanically to the valve stem, as for example, the stem of valve 26. Hence, in our invention, we find it desirable to employ this type of valve control, setting the thermocouple or potentiometer circuit at a value corresponding to the temperature which it is desired to maintain. Any changes in the temperature will cause a corresponding change in the electric circuits, which in turn will cause the solenoid valve to open or close, as the case may require.

In Fig. 2 there is indicated in cross-section a suitable form of pressure actuated valve, such as the valve 48. The valve body 60 is formed internally with an inwardly extending cup 61, open on the intake side 62, and connected at this point to the pipe 47. The cup 61 is formed with apertures or ports 63, normally closed by the discs 64 which contact on the lower sides of the ports, and which are interconnected by the valve stem 65 which projects upwardly through a gland 66 above the valve body 60. An upright yoke 67 is positioned around the exposed portion of the stem 65, and is provided with a pivot 68 for supporting a lever 69, the inner arm of which is hingedly connected to the stem 65, and the outer arm of which is weighted by the counterweights 70. It will thus be seen that the lever normally forces the valve stem upwardly, thereby bringing the discs 64 into contact with ports 63 to close the valve. If, however, the stem should be depressed, the ports will be opened, and fluid may pass into the compartment 61, and so on out through the pipe 50.

A pancaked housing 72 is positioned at the upper end of the yoke 67, and is formed of separable parts between which is clamped a flexible diaphragm 73, to the mid portion of which is secured the stem 65. The upper portion of the housing 72 is provided with a threaded aperture 74, into which is positioned the pipe 51, leading from the conduit 40. It will thus be seen that the pressure in the exhaust steam is transmitted to the diaphragm 73, and if this pressure exceeds the pressure exerted by the weighted lever 69, the discs 64 will move away from the ports 63, permitting more steam to pass, and if the pressure falls, the valve will close a proportinate amount, restricting the passage of steam. The weights 70 may be set to balance any predetermined pressure.

Fig. 3 shows in cross-section a suitable form of desuperheater 49. The unit consists of a housing 80 provided with a water intake pipe 81 which in the present invention is connected to the pipe 52. Superheated steam enters the housing through the port 82, flowing from the valve 48. The pipe 81 is turned at right angles to face the flow of steam, and it is provided at its end with a spray nozzle 83, so that the incoming water is sprayed into the steam, thereby assuring intimate mixture and rapid saturation. The saturated steam flows out of the housing 80 through the port 84, into a separator housing 85, which is provided with a baffle plate 86, and, after passing the baffle, flows through the port 87 into the pipe 50, by means of which it is conveyed to the preliminary evaporator 10. Excess water collecting in the housing 80 is drained therefrom through the opening 88, from whence it is conveyed by the pipe 53 to the steam chest of the evaporator 10. Water entrained in the steam, and separated therefrom by the baffle 86, collects in the well 89 of the housing 85, from which it may be drained through the port 90, being returned to the source of supply, or directed into the pipe 53. The pipe 81 may be connected to a thermally operated control valve, if desired, in order to regulate the amount of water entering into the housing 80 for saturation purposes.

It will, of course, be understood that the solenoid valves, pressure valve 48, and desuperheater 49 are not claimed as our invention, insofar as their detailed structure is concerned, and we simply make this explanation of their character for a fuller understanding of the use and principles of our system of evaporating solutions, and for a suggestion of the types of devices which we have used in attaining satisfactory results.

In the operation of the system, the solution to be treated is led into the evaporator 10 through the valve 12, wherein it is subjected to evaporation by the heat of steam entering through the pipe 13. This operation will normally proceed under vacuum or reduced pressure induced by the action of the condenser 16. The dehydrator 20, as it may be assumed, has meanwhile been cleared of air or condensed water by circulating saturated steam or superheated steam through the circuit, making use of the valves 45 or 46, and the correct degree of superheat necessary to the final evaporation has been attained. The partially evaporated solution is then transmitted from the evaporator 10 to the dehydrator 20, through the pipe line 18, under the pressure of the feed pump 19, and flows downwardly over the trays 21, there to contact with the superheated steam and be further evaporated. The final product is withdrawn through the valve 22, while the exhaust steam flows out through the port 28, through the pump 42, and thence to the superheater 30 and to the preliminary evaporator 10.

During the operation, the amount of superheat in the steam entering the dehydrator 20 is regulated, as is the amount of solution entering through the valve 26, and these two flows are balanced with respect to their available energy contents or requirements. Likewise, the division of exhaust steam, between the superheater circuit and the preliminary evaporator circuit, is controlled, so that uniformity of operation may be maintained at all times. It will be observed that the several controls operate not only upon a particular flow or medium, but are so interrelated as to maintain a constancy of operation in the entire system. With such operation, we have found it possible to evaporate to dryness solutions containing solids which heretofore have been treated in open pot evaporators or the like, with good economy of heat and the production of technically pure and satisfactory end products.

It is fairly obvious that the principles of the invention may be applied in ways other than those specifically referred to, and that valuable results may be obtained by employing portions of the complete system. Thus, in certain applications, it may be found expedient to supply the liquid to the dehydrator without preliminary evaporation, or to forego preliminary evaporation by use of the steam generated in the dehydrator. Similarly, a unitary control may be adopted for the mutual regulation of the flows of superheated steam and solution, so that variations in the one stream would follow adventitious and permitted variations in the other. Other possibilities could be enumerated, but we simply indicate in this connection our desire to have such departures, from the illustrative example herein given regarded as falling within the scope of the following claims.

We claim:—

1. The method of evaporating solutions which comprises subjecting the solution to a preliminary evaporation by means of heat transfer from a non-contacting body of steam, withdrawing the liquid so treated to a second zone of evaporation and therein further evaporating the solution by directly contacting the solution with superheated steam of predetermined and substantially constant energy content, removing from the second zone of evaporation a mixture of expended superheated steam and steam generated from the solution, dividing the removed steam into two portions, on of which corresponds to the steam evolved from said solution in said second zone, returning said portion to said first named step of evaporating to effect the preliminary evaporation of the solution, and automatically regulating the flow of solution from the region of preliminary evaporation to said second named zone in accordance with a predetermined temperature in the second zone of evaporation to maintain the rate of evaporation substantially constant and uniform.

2. The method of evaporating solutions which comprises subjecting the solution to a preliminary evaporation by means of heat transfer from a non-contacting body of steam, withdrawing the liquid so treated to a second zone of evaporation and therein further evaporating the solution by directly contacting the solution with superheated steam, withdrawing from said second zone a mixture of expended superheated steam and steam evolved from the solution, maintaining in said mixture a limited degree of superheat, dividing the mixture into two portions, returning one of said portions to the solution undergoing preliminary evaporation, and adding to the returned portion sufficient water to effect the saturation of said steam portion prior to the operation of heat transfer therefrom to the solution.

3. The method of evaporating solutions which comprises subjecting a solution to a preliminary evaporation with steam while maintaining a reduced pressure on said solution, withdrawing the generated and expended steam from the zone of evaporation, withdrawing the so-concentrated solution to a second zone of evaporation to effect the further concentration thereof, contacting the solution in the second zone with superheated steam to effect said concentration, regulating the flow of solution from the first named zone to the second zone in accordance with a predetermined temperature at a predetermined point in said second zone, withdrawing the expended superheated steam and generated steam from the second zone, dividing the withdrawn steam into two portions, returning one of said portions to the first zone for the preliminary evaporation of additional quantities of solution, and again superheating the other portion and recirculating the same to said second zone.

4. The method of evaporating solutions which comprises subjecting a solution to a preliminary evaporation under reduced pressure by means of a non-contacting body of steam, withdrawing the solution so treated to a second zone of evaporation and therein contacting the same with superheated steam, maintaining a substantially constant superheat condition in the superheated steam entering the second zone, varying the flow of solution from the first region of evaporation to the second region of evaporation in accordance with a predetermined temperature at a predetermined point in said second zone, withdrawing the expended superheated steam and generated steam from the second zone, dividing the withdrawn steam into two portions in accordance with the pressure thereof, returning one of said portions to the first zone to effect the preliminary evaporation of additional quantities of solution, superheating to a predetermined point the other portion of withdrawn steam, and returning said superheated steam to the second zone for use anew.

5. Apparatus for evaporating solutions comprising a shell, a preliminary evaporator, and a source of superheated steam, liquid intake and outlet connections for the shell, steam intake and outlet connections for the shell, liquid intake and outlet connections for the preliminary evaporator, a steam inlet connection for the preliminary evaporator, a conduit extending from the liquid outlet of the preliminary evaporator to the liquid intake connection of the shell, a conduit extending between the steam outlet connection of the shell and the steam intake connection of the preliminary evaporator, means in the liquid connecting conduit responsive to a predetermined temperature in the shell for regulating the flow of solution from the preliminary evaporator to the shell, means in the steam connecting conduit for regulating the flow of steam from the shell to the preliminary evaporator, and a connection from the source of superheated steam to the steam intake for the shell.

6. Apparatus for evaporating solutions comprising a shell, liquid intake and outlet connections for said shell, steam intake and outlet connections for the shell, said steam intake being connected to a superheater, control means in the connection for maintaining incoming steam at a predetermined temperature, a conduit leading from said steam exhaust connection to a branch pipe, one of said branches returning to the superheater to permit of the circulation and reconditioning of a portion of the exhaust steam, a pressure valve connected to said conduit for regulating the quantities of steam flowing through the branches, the other of said branches leading to a preliminary evaporator, means for admitting liquid to be evaporated to said preliminary evaporator, a pipe for withdrawing partially concentrated liquid from the evaporator, said pipe being connected to the liquid intake means of the shell, and control means in said pipe for controlling the flow of partially concentrated solution responsive to a predetermined temperature condition in the shell.

7. In a method of evaporating solutions wherein the solution is caused to flow counter to the flow of superheated steam and in contact therewith, the step which comprises regulating automatically the quantity of solution entering into contact with the steam in proportion to the temperature of the evaporating solution at a point in the evaporating system adjacent the discharge of the evaporated solution from the evaporator system.

8. A method of evaporating solutions comprising moving the solution to be evaporated in one direction in an evaporator system, moving superheated steam through the system in contact with the solution and counter thereto, maintaining the solution above a predetermined temperature at a point adjacent the discharge of the system by automatically varying the rate of flow of the solution through the system in response to changes in temperature of said solution and maintaining the temperature of said superheated steam substantially constant at a predetermined point in the system.

9. A method of evaporating solutions comprising moving the solution to be evaporated in one direction in an evaporator system, moving superheated steam through the system in contact with the solution and counter thereto, maintaining the solution above a predetermined temperature at a predetermined point in the system by automatically varying the rate of movement of said solution in response to changes in temperature of said solution at a predetermined point in said system adjacent the discharge thereof.

10. In a method of evaporating solutions wherein the solution is caused to flow counter to the flow of superheated steam and in contact therewith, the step which comprises regulating automatically the quantity of solution entering into contact with the steam in proportion to the temperature of the solution flowing past a predetermined point in the evaporator system adjacent the point of discharge of the evaporated solution from the system and adjacent the entrance of the superheated steam thereto.

11. A method of evaporating solutions which comprises passing the solution through the evaporator system in a thin film in one direction, passing superheated steam through the system in contact with the solution in another direction, regulating the temperature of the entering superheated steam at a predetermined point, and regulating automatically the quantity of solution entering into contact with the steam in proportion to the temperature of the solution flowing past a point in the evaporator system adjacent the discharge thereof.

BURTON S. HUGHES.
WILLIAM H. EGGERT.
STANLEY HUGHES.